2,648,749

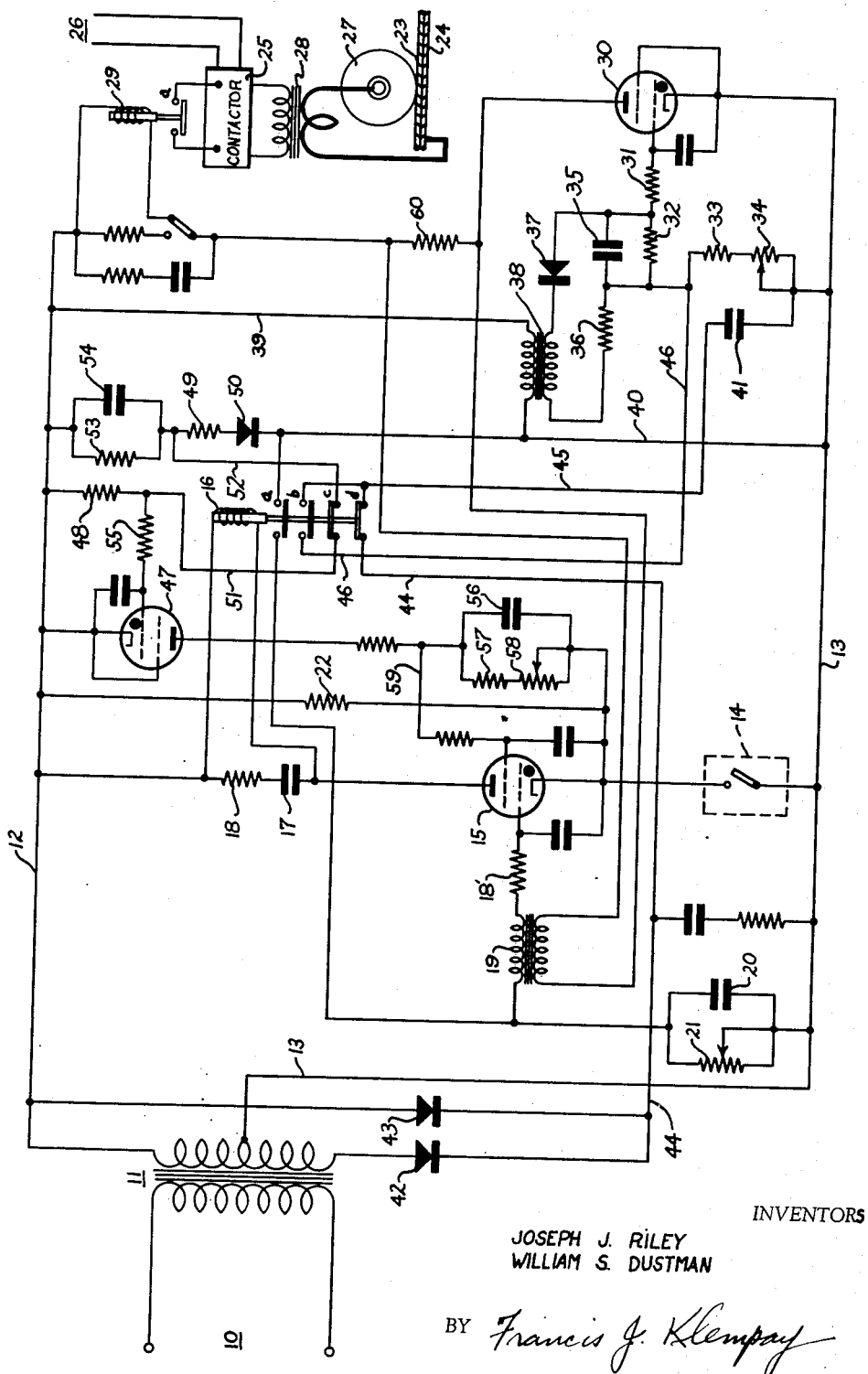
Aug. 11, 1953 — J. J. RILEY ET AL — 2,648,749
ELECTRONIC SEQUENCE CONTROL, PARTICULARLY
FOR TRAVEL HEAD SEAM WELDERS
Filed Jan. 31, 1952
INVENTORS
JOSEPH J. RILEY
WILLIAM S. DUSTMAN
BY Francis J. Klempay
ATTORNEY Patented Aug. 11, 1953

UNITED STATES PATENT OFFICE 2,648,749

ELECTRONIC SEQUENCE CONTROL, PARTICULARLY FOR TRAVEL HEAD SEAM WELDERS

Joseph J. Riley and William S. Dustman, Warren, Ohio, assignors to The Taylor-Winfield Corporation, Warren, Ohio, a corporation of Ohio Application January 31, 1952, Serial No. 269,246

7 Claims. (Cl. 219—4)

The present invention relates to electronic timing and control circuits and more particularly to a novel electronic control circuit for use in electric resistance welding apparatus wherein a plurality of sequentially related timed control periods are desirable.

It is an object of the present invention to provide a simplified yet wholly practical control circuit comprising a plurality of electronic discharge devices and magnetic switching devices arranged in a novel manner for producing a sequentially related series of control operations as is desired in performing a plurality of steps in an electric resistance welding operation, for example.

Another object of the present invention is the provision of a novel electronic control circuit, operable from a commercial A. C. power source, for controlling a plurality of sequentially related steps in a welding operation, for example, wherein certain provisions are made for the positive prevention of continued flow of welding current in the event of failure of any of the electronic discharge devices employed in the circuit. The arrangement taught herein, as will appear, provides that in the event of failure of any of the electronic discharge devices of the circuit to fire properly as contemplated, the welding period, wherein high current flows to workpieces to be welded, will either not be initiated, or if previously initiated will time out properly or end prematurely.

Yet another object of the present invention is the provision in an electronic control circuit adapted for operation from a commercial A. C. power source of means for controlling a plurality of phases in a complete welding operation wherein certain provisions are made in combination with initiating switch means for the circuit whereby upon said initiating switch being opened to terminate a series of operations welding current will be interrupted within a maximum time interval of one cycle of voltage variation from the power source utilized. The teachings of the present invention are particularly useful in controlling the operation of traveling head type seam welders wherein a rotary welding electrode is passed over the work to be welded and wherein means responsive to the said rotary electrode nearing the edges of the workpieces is utilized to initiate and terminate a series of welding operations. The arrangement disclosed finds particularly advantageous use with travel head seam welding apparatus and strip detecting means as disclosed in co-pending application Ser. No. 239,914, filed August 2, 1951, entitled "Current Control for Travel Head Strip Seam Welder." The apparatus disclosed in the above named co-pending application includes a rotary welding electrode which passes laterally over strip workpieces to be welded and utilizes a mechanical strip-detecting follower wheel positioned ahead of the welding electrode to initiate and terminate the welding operation at the edges of the strip. As will become apparent hereinafter the control circuit of the present invention provides for a predetermined delay period after initiation by such strip detecting means wherein the welding electrode may move a sufficient distance onto the work before welding current begins to flow, and further provides that when such strip detecting means reaches the far edge of the strip welding current, if flowing at the time, will be cut off substantially instantaneously to prevent damage to the side edges of the strip.

Yet another object of the present invention is the provision of a novel electronic control circuit of the type and for the purposes above described which may be conveniently and effectively operated from a standard commercial sixty-cycle A. C. power source without requiring the use of additional circuit components for regulating and compensating for voltage variations inherent in the source.

Yet another object of the present invention is the provision of an electronic control circuit adapted for operation from an A. C. power source, for controlling a plurality of sequentially related operations wherein a minimum of discharge devices and other components is required, and wherein such components may be standardized insofar as practicable to reduce maintenance and repair costs.

The above and other objects and advantages of the invention will become apparent upon full consideration of the following detailed specification and accompanying drawing wherein is disclosed a certain preferred embodiment of the invention.

The sole figure of the drawing is a schematic representation of an electronic sequence control circuit constructed in accordance with the principles of our invention.

In the drawing, the reference numeral 10 designates a commercial sixty-cycle alternating current power source to which is connected a power transformer 11 for the control circuit of our invention. Terminal conductors 12 and 13, the latter being connected to a center tap of transformer 11, provide a source of operating potential for the principal components of the circuit as will appear.

Connected across conductors 12 and 13, through an initiating switch 14 is a gaseous type electric discharge device 15 of the type having an anode, cathode, control grid and screen grid; the anode thereof being connected to terminal conductor 12 and the cathode to conductor 13 as shown. A conventional switch is shown at 14 for purposes of illustration, but it will be understood that such switch may be of the type shown in co-pending application Ser. No. 239,914, filed August 2, 1951, as explained.

Connected in series relation with the anode of discharge device 15 is the operating coil of a solenoid relay 16, and it will be understood that the relay 16 will become energized in response to the passage of current through the discharge device 15. The discharge device 15, operating from the alternating anode-cathode potential supplied by conductors 12 and 13, fires only on alternate half cycles when so conditioned and accordingly we have conventionally provided a capacitor 17 and resistor 18 in parallel connection with the operating coil of relay 16 whereby half-cycle surges of energy passing from discharge device 15 may be alternately stored and released by the capacitor 17 to maintain relay 16 in an energized condition during the non-conducting half cycle of the conduction periods of discharge device 15.

In order to condition discharge device 15 for firing at the proper time we have provided a control grid circuit therefor which is normally referenced to cathode potential at conductor 13 and which includes a current limiting resistor 18', the secondary winding of an impulse transformer 19 and an energy storage network comprising a capacitor 20 and potentiometer 21 connected in parallel therewith. It will be apparent that by suitably charging the capacitor 20 to provide a negative control grid signal on the discharge device 15 the latter may be rendered non-conductive, and will remain in such state until the charge on capacitor 20 has been dissipated substantially through the potentiometer 21. Thus the rate of dissipation of energy through the potentiometer, and accordingly the time period wherein discharge device 15 may be maintained in a non-conductive state is determinable by the slide wire setting of the potentiometer.

For charging the capacitor 20 to provide a negative grid signal for discharge device 15 we have provided a resistor 22 which is connected to the terminal conductor 12 and to the cathode of discharge device 15. Thus, with initiating switch 14 open as shown, discharge device will conduct between its control grid and cathode and the capacitor 20 accordingly assumes a highly negative charge. When the initiating switch 14 is closed the resistor 22 is connected directly between conductors 12 and 13 and its effect upon discharge device 15 is eliminated. Accordingly the capacitor 20 begins at this time to discharge its energy through potentiometer 21. A predetermined time after the closing of switch 14, depending upon the setting of potentiometer 21, the charge on capacitor 20 is sufficiently dissipated to permit conduction in discharge device 15, and such conduction occurs on the next positive half-cycle of anode-cathode potential as will be understood. The predetermined time interval between the closing of switch 14 and the firing of discharge device 15 provides a "squeeze time" period for the welding operation as will appear.

In the illustrated control circuit the firing of discharge device 15, and the consequent energization of relay 16 initiates the flow of weld current to work pieces 23 and 24 and begins the timing of the weld period as according to the desired operation of the apparatus wherein it is contemplated that the circuit will be employed.

To control the flow of welding current we have provided a conventional welding contactor 25 which connects a power source at 26 and is in communication with a welding electrode 27 through a suitable welding transformer 28. The contactor 25 may be of the type utilizing inversely connected mercury arc discharge devices, not shown, and it is contemplated that the same will be rendered conductive upon the energization of relay 29 and closing of contacts 29a thereof. In the present embodiment of the invention relay 29 may be energized by means of a gaseous discharge device 30 which is connected between the terminal conductors 12 and 13 and in series with the operating coil of the relay 29.

Discharge device 30 is of the type having a control grid and according to the teachings of the invention we have provided a control grid circuit for discharge device 30 comprising means normally operative to impress thereon a negative hold-off grid bias and additional means in series with the biasing means to provide a positive signal of sufficient magnitude to overcome the negative bias and render the discharge device 30 conductive for a predetermined time interval.

As appears in the drawing the control grid of discharge device 30 is normally referenced to its cathode potential at conductor 13 through series connected resistors 31, 32 and 33, and potentiometer 34. Connected across the resistor 32 is a capacitor 35, and in series with capacitor 35 are a resistor 36, rectifier 37 and secondary winding of a transformer 38. The primary winding of transformer 38 is connected to terminal conductors 12 and 13 through conductors 39 and 40, and it will be apparent from an inspection of the arrangement of the components and the disposition of the rectifier 37 that a substantially constant D. C. voltage will appear across the capacitor 35 and accordingly resistor 32 whereby a negative D. C. biasing potential will be impressed upon the control grid of discharge device 30.

To counteract the effect of the D. C. negative biasing potential appearing across resistor 32 we have provided a capacitor 41 which is connectible in parallel with resistor 33 and potentiometer and in series with resistor 32. By providing a sufficiently high positive charge upon the capacitor 41 we may impress a positive grid signal upon discharge device 30 and render the same conducting as will be understood.

In the present embodiment of the invention we have provided full-wave rectifying means including transformer 11, rectifier units 42 and 43, conductor 44, normally closed contacts 16d of relay 16, conductor 45 and terminal conductor 13 for normally maintaining a high positive charge on capacitor 41. Upon relay 16 becoming energized, however, contacts 16d thereof open and normally open contacts 16b are closed whereby the capacitor 41 is disconnected from the charging circuit therefor and connected across resistor 33 and potentiometer 34 through conductor 45, contacts 16b and conductor 46. The highly positive signal thus impressed into the control grid for discharge device 30 renders the same conductive over the negative bias appearing across resistor 32. Capacitor 41, of course, discharges its energy through resistor 33 and potentiometer at a rate determined by the ohmic value thereof and accordingly after a predetermined time interval the negative bias voltage again exceeds the positive grid signal from capacitor 41 and discharge device 30 is rendered non-conducting. Relay 29 and consequently contactor 25 are energized by conduction in discharge device 30, and it will thus be understood that the "weld time" period will be determined by the time constant characteristics of capacitor 41 and associated resistor and potentiometer 33 and 34 respectively.

In the normal operation of the circuit described herein it is contemplated that a predetermined delay period or "cool time" will occur immediately after the "weld time" period, and that immediately after the "cool time" period the "weld time" period will be repeated. It is understood, of course, that during such "cool time" period the welding electrode 27 will have advanced to a new position over the workpieces 23 and 24, and that by a thus repeated series of operations the electrode wheel 27 will completely traverse the workpieces while making a plurality of spaced welds thereon.

For controlling the "cool time" period we have provided another gaseous discharge device 47 which is connected between terminal conductors 12 and 13 through initiating switch 14. According to the teaching of the invention, discharge device 47 is connected in anti-parallel with discharge device 15, i. e., the cathode of discharge device 47 is connected to terminal conductor 12 whereas the anode of discharge device 15 is connected to the said terminal conductor 12.

Discharge device 47 is of the type having a control grid, and for conditioning the control grid in the manner taught by the invention we provide circuit means including conductor 40, rectifier unit 50, resistor 49 and an energy storage network comprising resistor 53 and capacitor 54, which components are connected in series in the order stated. As shown in the drawing the above named series connected components are connected across terminal conductors 12 and 13, and it will be apparent that half-wave cycles of current will pass from conductor 13 to conductor 12 whereby a potential drop appears across resistor 53 which is maintained at a relatively constant value by virtue of the energy storage characteristics of capacitor 54.

Thus to provide a negative hold-off control grid bias for discharge device 47 we have connected the grid of the said device 47 through a conventional current limiting resistor 55, conductor 51, normally closed contacts 16c of relay 16 and conductor 52 to the resistor 53, whereby the potential drop appearing across the latter is impressed upon discharge device 47 to normally maintain the same in a non-conductive state. When relay 16 is energized, however, by the firing of discharge device 15, contacts 16c are opened and negative biasing potential is removed from discharge device 47 conditioning it for conduction. A resistor 48 is provided between resistor 55 and terminal conductor 12 whereby the grid of discharge device 47 may be referenced to cathode potential during such time as contacts 16c are open, but it will be understood that the resistor 48 is of such high value as to not appreciably affect the application of a negative bias to the discharge device 47 when contacts 16c are closed.

Connected in series with the anode of discharge device 47 is a time constant network comprising capacitor 56, resistor 57 and potentiometer 58. Capacitor 56 will of course become charged during conduction of discharge device 47 and will discharge at a predetermined rate through resistor 57 and 58 upon termination of such conduction. Thus by connecting the screen grid of discharge device between the capacitor 56 and the anode of discharge device 47 through conductor 59 we may cause a negative hold-off signal to appear for a predetermined time upon discharge device 15 to render the same non-conducting and provide a "cool time" period as will become apparent.

During a "weld time" period it is necessary to maintain discharge device 15 conducting and accordingly we have connected the primary winding of impulse transformer 19 in the anode circuit of discharge device 30. The primary terminals of transformer 19 are connected across resistor 60 whereby periodical impulses of positive potential are impressed upon the grid of discharge device 15 to overcome the effect of the negative screen bias and continue the firing of discharge device 15. It is of course undesirable to store such positive impulses in the capacitor 20, and it will be noted that we avoid this by providing circuit means including conductor 61, normally open contacts 16a of relay 16 and conductor 40 whereby the secondary winding of transformer 19 may be referenced to cathode potential at terminal conductor 13 without causing potential to be impressed upon capacitor 20.

In the arrangement described, upon the termination of the "weld time" period in consequence of the discharging of capacitor 41, positive impulses cease to be impressed upon transformer 19 and accordingly discharge device 15 is rendered non-conducting due to the negative screen grid bias thereon. Relay 16 is of course deenergized and discharge device 47 is thus extinguished by a negative control grid bias which is impressed thereon by resistor 53. Discharge device 15 is maintained non-conductive until such time as the charge upon capacitor 56 is sufficiently dissipated, whereupon it is again rendered conductive to initiate a new "weld time" period.

It will be understood that during the "cool time" period wherein discharge device 15 is non-conductive and relay 16 is deenergized, capacitor 41 will be connected into the charging circuit therefor through normally closed contacts 16d and thus will be fully charged and conditioned to initiate a new "weld time" period upon reinitiation of conduction in discharge device 15.

In the contemplated operation of the control circuit herein disclosed it may be desirable to utilize automatic strip detecting means positioned a short distance ahead of the point of contact of the electrode wheel 27 with the workpieces 23 and 24 and accordingly it is necessary that welding current be interrupted substantially instantaneously upon such detecting means reaching the edge of the work at the end of a traverse thereacross. It will be particularly noted in this respect that in the circuit of our invention opening of the switch 14, as caused, for example, by strip detecting means reaching the edge of the work, will immediately extinguish discharge device 15 and cause deenergization of relay 16 not later than one half cycle later; a maximum time of one half cycle sometimes being necessary to discharge capacitor 17 as will be understood. Deenergization of relay 16 immediately extinguishes discharge device 30 by removing the conduction sustaining capacitor 41 from the grid circuit thereof, and after a maximum time lapse of one half cycle relay 29 will become deenergized to stop the flow of weld current. Thus it will be understood that regardless of what point in a complete cycle of operations the circuit herein illustrated may be at the time the switch 14 is opened, there is positive assurrance that weld current will continue to flow no longer than the time necessary to complete one full cycle of voltage fluctuation from the commercial power source 10.

It should thus be apparent that we have accomplished the objects initially set forth in providing a novel electronic control circuit, operable from a commercial A. C. power source, for controlling a plurality of sequentially related timed phases of a welding cycle. The circuit disclosed here is of utmost simplicity, utilizing three gaseous discharge devices and two switching relays to provide three accurately timed and independently adjustable sequentially related control phases. The remaining components required to complete the circuit in the manner taught are conventional commercial electrical components which may be readily purchased at low cost.

Each of the timed control phases obtained in our circuit are controlled by discharging R. C. time constant circuits which are inherently accurate, and it may be further noted that each such time constant network is subject to the same voltage variations as is the discharge device associated therewith. This combination provides for proper performance of the control even during source voltage variations of as much as twenty percent above or below rated voltage. Such variations may be expected where intermittent operation of high power consuming apparatus occurs, and thus the control of our invention is ideally suited for its contemplated use in controlling electric resistance welders.

Our control is particularly adapted for use in seam welding operations and may be advantageously employed in apparatus therefor wherein is employed automatic strip detecting means of the type disclosed in co-pending application Ser. No. 239,914, filed August 2, 1951. In the preferred use of such strip detecting means the same is positioned ahead of the rotary electrode 27 and accordingly it is desirable to provide a delay period after the initial closing of switch 14 before the contactor 25 is energized, and it is also desirable to provide that upon reopening of the same switch 14 the contactor 25 will be deenergized substantially instantaneously to interrupt the flow of weld current before the electrode wheel 27 reaches the edge of the workpieces 23 and 24. The control circuit of the present invention satisfies these conditions in a wholly effective and practical manner as should be apparent.

Having thus described in detail a preferred embodiment of our invention, what we claim as new and desire to secure by Letters Patent is:

1. In a control circuit for controlling a plurality of sequentially related operations of a welding machine of the type having electrodes and a weld contactor for controlling the flow of weld current to said electrodes; the combination of an A. C. power source, first relay means adapted to be energized by said source and operative when energized to energize said contactor, a first gaseous discharge device connected in series with said relay means adapted when conducting to cause energization thereof, said first discharge device having a control grid, means to maintain a negative potential on said grid whereby said first discharge device is maintained normally non-conductive, time constant means including a first capacitor and first potentiometer associated with said control grid and operative when said first capacitor is fully charged to render said first discharge device conducting for a predetermined time, a second relay having normally open contacts connected in series with said first capacitor whereby said capacitor is normally disconnected from said grid, charging means for said first capacitor including a source of unidirectional potential and normally closed contacts of said second relay, energizing means for said second relay including a second gaseous discharge device of the type having screen and control grids, said second discharge device being connected in series with said second relay whereby said relay may be energized upon conduction in said second discharge device, a normally open initiating switch connected in series with said second discharge device and adapted to control the application of anode-cathode potential thereto from said A. C. power source, a control grid circuit for said second discharge device including a time constant network comprising a second capacitor and second potentiometer, means operative when said switch is open to charge said second capacitor whereby a negative control grid signal is applied to said second discharge device upon closing of said switch, translating means connected in series with said first discharge device and associated with the control grid of said second discharge device operative during conduction in said first discharge device to apply a positive control grid signal to said first discharge device, a screen grid circuit for said second discharge device including a time constant network comprising a third capacitor and third potentiometer, means to charge said third capacitor whereby a negative screen grid signal is applied to said second discharge device to render the same non-conductive upon cessation of said positive signal from said first discharge device, said means to charge said third capacitor including a third gaseous discharge device connected to said power source through said switch, means to normally maintain said third discharge device non-conducting, and means including contacts of said second relay to render said third discharge device conducting during energization of said second relay.

2. In a control circuit for controlling a plurality of sequentially related operations of a welding machine of the type having electrodes and a weld contactor for controlling the flow of weld current to said electrodes; the combination of a power source, a first relay adapted to be energized by said source and operative when energized to energize said contactor, a first gaseous discharge device connected to said source and adapted when conducting to cause energization of said first relay, said discharge device having a control grid, circuit means associated with said control grid for applying a negative biasing potential thereto, means including a time constant network comprising a first capacitor and first potentiometer for applying a positive grid signal to said first discharge device to render the same conducting, a second relay having normally open contacts connected in series with said first capacitor whereby said capacitor is normally disconnected from said grid, charging means for said first capacitor including normally closed contacts of said second relay, energizing means for said second relay including a second gaseous discharge device of the type having screen and control grids, a normally open initiating switch for controlling the application of anode-cathode potential to said second discharge device from said source, circuit means for the control grid of said second discharge device including time constant means operative upon closing of said switching means to render said second discharge device conducting after a predetermined time delay, translating means in said last mentioned circuit means associated with said first discharge device and operative responsive to conduction therein to maintain said second discharge device conducting, means including contacts of said second relay operative during energization of said second relay to apply a negative signal to the screen grid of said second discharge device whereby upon termination of conduction in said first discharge device said second discharge device is rendered non-conducting, and time constant network means associated with said screen grid operative to maintain said negative screen signal for a predetermined time after deenergization of said relay.

3. In a control circuit for controlling a plurality of sequentially related operations of a welding machine of the type having electrodes and a weld contactor for controlling the flow of weld current to said electrodes; the combination of a power source, switching means adapted to be energized by said source and operative to energize and deenergize said contactor, said switching means including a first grid-controlled gaseous discharge device, a control grid circuit for said first discharge device including means to provide a negative biasing potential thereon and means to provide a positive signal to overcome said biasing potential and render said first discharge device conducting, said last mentioned means including normally open contacts of a relay, a second gaseous discharge device, a normally open initiating switch operative when closed to connect said second discharge device to said source, said relay being associated with said second discharge device whereby conduction in the latter causes energization of the former, means including a time constant network and said relay tending to render said second discharge device non-conducting when said relay is energized and means associated with said first and second discharge devices for maintaining said second discharge device conducting when said first discharge device is conducting, said time constant network being operative a predetermined time after termination of conduction in said first discharge device to recondition said second discharge device for conduction.

4. In a control circuit for controlling a plurality of sequentially related operations of a welding machine of the type having electrodes and a weld contactor for controlling the flow of weld current to said electrodes; the combination of a power source, switching means adapted to be energized by said source and operative when energized to energize said contactor, a discharge device, a normally open switch adapted when closed to connect said discharge device to said power source, means associated with said switching means and said discharge device operative responsive to conduction in said discharge device to energize said switching means, means including a capacitor-potentiometer time constant network and a source of charging potential therefor responsive to conduction in said discharge device to oppose said conduction, time constant means associated with said switching means operative a predetermined time after energization thereof to deenergize said switching means, and means associated with said discharge device and responsive to energization of said switching means to overcome said means to oppose conduction and maintain conduction in said discharge device while said switching means is energized, the arrangement being such that said time constant network renders said discharge device non-conductive for a predetermined time after deenergization of said switching means.

5. In a control circuit for controlling operations of electric resistance welding apparatus of the type having electrodes and a weld contactor for controlling the flow of weld current to said electrodes; the combination of switching means operative when energized to energize said contactor, means to energize said switching means including a gaseous discharge device, time constant means for deenergizing said switching means a predetermined time after energization thereof, said gaseous discharge device having a control electrode means therein, a source of power, a normally open initiating switch operative when closed to connect said discharge device to said source, time constant means connected to said discharge device adapted to render the same conductive a predetermined time after the closing of said switch, means associated with said switching means and said discharge device operative upon deenergization of said switching means to cause said discharge device to be rendered non-conductive, and time constant means operative a predetermined time after termination of conduction in said discharge device to again render said device conducting.

6. Apparatus according to claim 5 further characterized by said last mentioned time constant means comprising a capacitor and potentiometer connected in parallel, and another gaseous discharge device connected in series with said time constant means for charging said capacitor, said discharge device being normally non-conductive, means connecting said capacitor with said control electrode means whereby a negative signal may be applied thereon to oppose conduction in said first mentioned discharge device, and means responsive to conduction in said first mentioned discharge device to render said another discharge device conducting, said means associated with said discharge device and said switching means being operative to overcome said negative signal when said switching means is energized.

7. In a control circuit for controlling operations of electric resistance welding apparatus of the type having electrodes and a weld contactor for controlling the flow of weld current to said electrodes; the combination of an alternating current power source, a gaseous discharge device, a normally open switch operative when closed to connect said discharge device to said source, another discharge device connected in anti-parallel with said first mentioned discharge device, means operative after closing of said switch to condition said discharge devices for conduction, means responsive to conduction in one of said discharge devices operative to energize said contactor, first time constant means associated with said contactor operative a predetermined time after energization thereof to cause deenergization thereof, second time constant means associated with said first mentioned and said another discharge device and energized by conduction in said another discharge device adapted to oppose conduction in said first mentioned discharge device, means associated with said first mentioned discharge device and said energizing means for said contactor operative to overcome said second time constant means when said contactor is in an energized condition to maintain conduction in said first discharge device, means responsive to termination of conduction in said first mentioned discharge device to render said another discharge non-conducting, said second time constant means being operative to maintain said first mentioned discharge device non-conducting for a predetermined time after termination of conduction in said another discharge device.

JOSEPH J. RILEY.
WILLIAM S. DUSTMAN.

References Cited in the file of this patent

UNITED STATES PATENTS

| Number | Name | Date |
|---|---|---|
| 2,224,864 | Duinker | Dec. 17, 1940 |
| 2,460,990 | Kratz | Feb. 8, 1949 |
| 2,491,413 | Lexa | Dec. 13, 1949 |
| 2,533,318 | Hartwig | Dec. 12, 1950 |
| 2,574,939 | Stanback | Nov. 13, 1951 |